(12) United States Patent
Moon et al.

(10) Patent No.: US 9,647,710 B2
(45) Date of Patent: May 9, 2017

(54) ELECTRONIC DEVICE INCLUDING COMMUNICATIONS MODULE

(71) Applicant: SAMSUNG ELECTRO-MECHANICS CO., LTD., Suwon-si (KR)

(72) Inventors: Dong Teck Moon, Suwon-si (KR); Doo Il Kim, Suwon-si (KR); Tae Hoon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/093,394

(22) Filed: Apr. 7, 2016

(65) Prior Publication Data

US 2016/0315647 A1   Oct. 27, 2016

(30) Foreign Application Priority Data

Apr. 24, 2015 (KR) .......................... 10-2015-0057993
Sep. 4, 2015 (KR) .......................... 10-2015-0125796

(51) Int. Cl.
*H04M 1/00* (2006.01)
*H04B 1/3822* (2015.01)
*H04B 1/40* (2015.01)

(52) U.S. Cl.
CPC ............. *H04B 1/3822* (2013.01); *H04B 1/40* (2013.01)

(58) Field of Classification Search
CPC ....... H04B 1/0343; H04W 4/008; H04L 67/22
USPC .............. 455/575.1, 90.3, 550.1, 575.6, 100; 343/718

See application file for complete search history.

(56) References Cited

U.S. PATENT DOCUMENTS

| 7,204,425 | B2* | 4/2007 | Mosher, Jr. ............ A61B 5/117 235/375 |
| 7,251,197 | B2* | 7/2007 | Yoshida ................. H04B 1/385 368/10 |
| 2006/0260842 | A1 | 11/2006 | Sim et al. |
| 2011/0307592 | A1* | 12/2011 | de la Huerga ........ A61J 1/1437 709/223 |
| 2015/0062840 | A1 | 3/2015 | Kim |
| 2015/0331447 | A1* | 11/2015 | Hasegawa ............ H05K 1/0281 361/679.03 |

FOREIGN PATENT DOCUMENTS

KR   10-2006-0119007 A   11/2006
KR   10-2015-0026082 A   3/2015

* cited by examiner

*Primary Examiner* — Sonny Trinh
(74) *Attorney, Agent, or Firm* — NSIP Law

(57) ABSTRACT

An electronic device includes a strap, a coupling part disposed on one end of the strap, configured to couple the one end of the strap to another end of the strap, and a communications module embedded in the coupling part and configured to perform wireless communications.

20 Claims, 13 Drawing Sheets

LAYER2

LAYER3

TOP

BOTTOM

ELECTRONIC DEVICE INCLUDING COMMUNICATIONS MODULE

CROSS-REFERENCE TO RELATED APPLICATION

This application claims the benefit under 35 USC 119(a) of Korean Patent Application Nos. 10-2015-0057993, filed on Apr. 24, 2015, and 10-2015-0125796, filed on Sep. 4, 2015, with the Korean Intellectual Property Office, the entire disclosures of which are incorporated herein by reference for all purposes.

BACKGROUND

1. Field

The following description relates to an electronic device including a communications module.

2. Description of Related Art

Recently, demand for wearable electronic devices such as smartwatches has rapidly increased. Such wearable electronic devices perform communications with an external electronic apparatus, whereby a user may operate the external electronic apparatus or view information related to the external electronic apparatus.

The wearable electronic device is worn on the body, such that it may be frequently exposed to external contact. The necessity for a wearable electronic device in which durability against external contact is improved has increased. However, generally, it is difficult to improve the durability of wearable electronic devices due to limitations on the size of wearable electronic devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a strap, a coupling part disposed on one end of the strap, configured to couple the one end of the strap to another end of the strap, and a communications module embedded in the coupling part and configured to perform wireless communications.

The electronic device may further include an attaching part configured to attach and detach the coupling part to and from the strap.

The electronic device may further include a display part disposed on the strap and configured to display information.

The electronic device may further include a battery embedded in the strap and configured to supply power to the communications module, and a flexible substrate embedded in the strap, configured to electrically connect the battery to the communications module, and resiliently bend.

The communications module may include a substrate, a communications circuit mounted on the substrate and configured to process communications signals, an antenna disposed on the substrate and configured to transmit and receive the communications signals, and a battery disposed on the substrate and configured to supply power to the communications circuit. Of the communications circuit, the antenna, and the battery, one may be mounted on one surface of the substrate, and two may be mounted on another surface of the substrate. The communications circuit may be configured to process first communications signals and second communications signals, wherein the second communications signals may be in a frequency band higher than that of the first communications signals.

The communication module may further include a high frequency antenna configured to transmit and receive the second communications signals. The high frequency antenna may surround a portion of the communications circuit. The antenna comprises three coil antennas configured to transmit and receive the first communications signals in different directions.

The communications module may be configured to transmit and receive the first communications signals to control a vehicle.

The electronic device may further include a second communications module embedded in the strap and may be configured to perform wireless communications. The second communications module may include a second substrate comprising a resiliently flexible region, a second communications circuit mounted on a substrate region external to the resiliently flexible region and configured to process communications signals, a second antenna mounted on the substrate region external to the resiliently flexible region and configured to transmit and receive the communications signals, and a second battery mounted on the substrate region external to the resiliently flexible region and configured to supply power to the second communications circuit.

A portion of the battery may be externally exposed.

In another general aspect, an electronic device includes a strap, a coupling part disposed on one end of the strap configured to couple one end of the strap to another end of the strap, and a communications module embedded in the strap and configured to perform wireless communications. The communications module includes a substrate having a resiliently flexible region, a communications circuit mounted on a substrate region other than the resiliently flexible region and configured to process communications signals, an antenna mounted on the substrate region other than the resiliently flexible region and configured to transmit and receive the communications signals, and a battery mounted on the substrate region other than the resiliently flexible region and configured to supply power to the communications circuit.

The electronic device may further include a display part disposed on the strap, electrically connected to the communications module, and configured to display information received from the antenna.

The communications circuit may be configured to process first communications signals and second communications signals, wherein the second communications signals may be in a frequency band higher than that of the first communications signals. The communications circuit may further include a high frequency antenna configured to transmit and receive the second communications signals.

The communications module may be configured to transmit and receive first communications signals for vehicle control, and the antenna may include three coil antennas configured to transmit and receive the first communications signals in different directions.

The battery may be disposed on the substrate at one side of the resiliently flexible region, and the communications circuit and the antenna may be disposed on the substrate at another side of the resiliently flexible region.

The substrate may include first and second resiliently flexible regions. The communications circuit may be disposed between the first and second resiliently flexible regions, and the antenna and the battery may be disposed on opposite ends of the substrate.

Other features and aspects will be apparent from the following detailed description, the drawings, and the claims

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
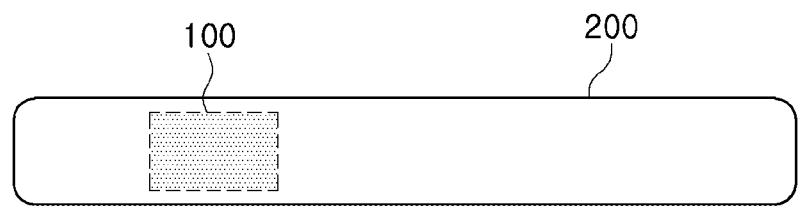
FIGS. 1A and 1B are diagrams illustrating an electronic device according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Unless indicated otherwise, a statement that a first layer is "on" a second layer or a substrate is to be interpreted as covering both a case where the first layer directly contacts the second layer or the substrate, and a case where one or more other layers are disposed between the first layer and the second layer or the substrate.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Figure 1B:
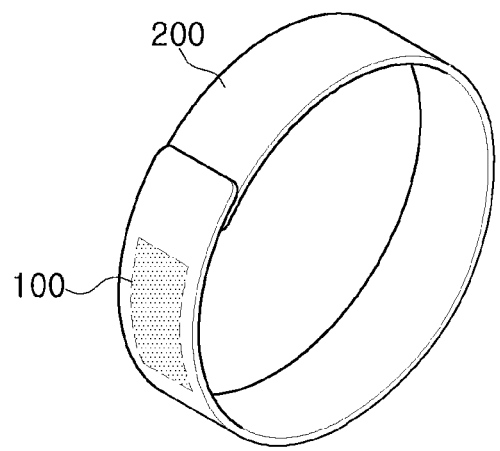

FIGS. 1A and 1B are diagrams illustrating an electronic device according to an embodiment. Referring to FIG. 1A, the electronic device includes a communications module 100 and a strap 200. In an example, the communications module 100 may not be exposed to a surface of the strap 200, or may be partially or entirely exposed.

Referring to FIG. 1B, the strap 200 is flexible in order for one end of the strap 200 to be connected to the other end. Therefore, the communications module 100 is flexible and/or miniaturized in order to allow the strap 200 to flex.

Meanwhile, the strap 200 that has one end and the other end connected to each other and may be worn on the human body may be used in a watch, a belt, or a wearable band. Therefore, the communications module 100 perform communications while adjacent to the human body. A detailed description of the communications module 100 will be described below with reference to FIG. 2.

Figure 2:
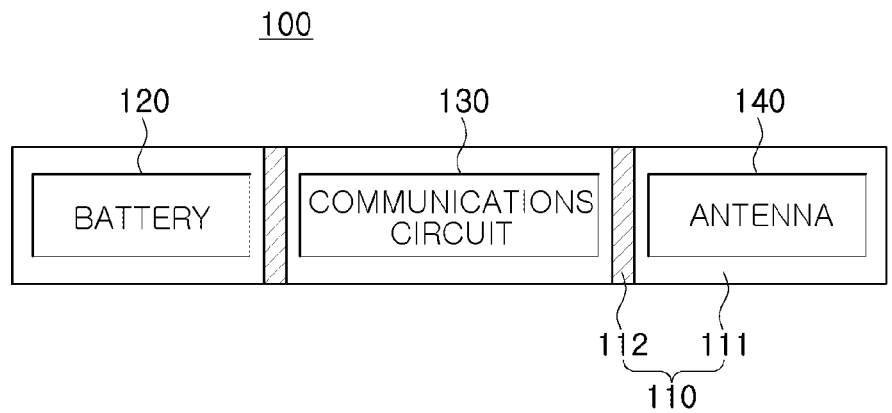
FIG. 2 is a block diagram illustrating a communications module of the electronic device of FIG. 1.

FIG. 2 is a block diagram illustrating a communications module of FIG. 1. Referring to FIG. 2, the communications module 100 includes a substrate 110, a battery 120, a communications circuit 130, and an antenna 140. A plurality of circuits for processing signals or supplying power are mounted on the substrate 110. For example, the substrate 110 may be one of a ceramic substrate, a flexible substrate, a printed circuit board (PCB), a flexible printed circuit board (FPCB), and a rigid PCB, or any combination thereof. Therefore, the substrate 110 may be flexible and/or miniaturized.

For example, the substrate 110 includes a plurality of first regions 111 and at least one second region 112 disposed between each first region 111. At least one of the battery 120, the communications circuit 130, and the antenna 140 is mounted in each of the plurality of first regions 111. The at least one second region 112 electrically connects the plurality of first regions 111 and may be resiliently deformed.

The battery 120 supplies power to the communications circuit 130. For example, the battery 120 may be larger than the communications circuit 130 or the antenna 140. A layout of the battery 120 has a relatively large influence on flexibility and/or miniaturization of the overall communications module 100. Therefore, the battery 120 and the communications circuit 130 or the antenna 140 may be disposed separate first regions 111 with at least one second region 112 interposed therebetween.

The communications circuit 130 generates, processes, transmits and receives signals for the communications module 100. For example, the communications circuit 130 generates, processes, transmits and receives respective signals in a low frequency band and signals in a high frequency band.

For example, the communications circuit 130 includes a high frequency antenna for transmitting and receiving signals in the high frequency band. In addition, the communications circuit 130 also transmits signals in the low frequency band to the antenna 140, and receives signals in the low frequency band from the antenna 140. The antenna 140 transmits or receives signals generated and processed in the communications circuit 130. The lower the frequency of the signal transmitted and received by the antenna 140, the larger the size of the antenna 140. Therefore, in a case in which the antenna 140 transmits and receives low frequency signals, a ratio of the size of the antenna 140 to an overall size of the communications module 100 may be large. That is, a layout of the antenna 140 has a relatively large influence on flexibility and/or miniaturization of the overall communications module 100. Therefore, the antenna 140 and the communications circuit 130 or the battery 120 are separated from each other by disposing each component on a separate first region 111 with the at least one second region 112 interposed therebetween.

For example, the antenna 140 may be a low frequency antenna transmitting and receiving signals having a frequency of 125 KHz, and may have specific directivity. Therefore, the antenna 140 includes a plurality of antenna elements so that it uniformly transmits and receive signals in x axis, y axis, and z axis directions.

As described above, the battery 120, the communications circuit 130, and the antenna 140 may be separated from each other by being disposed on separate first regions 111 with at least one second region 112 disposed between the first regions 111. Thus, the communications module 100 according to an embodiment may be flexible and/or be miniaturized.

Additionally, any two of the battery 120, the communications circuit 130, and the antenna 140 may be disposed together in a single first region. For example, depending on characteristics of the signals generated and processed in the communications circuit 130, the size of the antenna 140 may be relatively small. Therefore, the communications circuit 130 and the antenna 140 may be disposed together in a single first region 111. In a case in which the communications module 100 is wirelessly charged through the antenna 140, the volume of the battery 120 may be reduced. The battery 120 may be disposed in a single first region 111 together with the communications circuit 130 or the antenna 140. Therefore, the battery 120, the communications circuit 130, and the antenna 140 are not required to be separated from each other. While FIG. 2 illustrates an embodiment in which the battery 120, the communications circuit 130, and the antenna 140 are separated from each other for convenience of explanation, the battery 120, the communications circuit 130, and the antenna 140 are not limited to being separated from each other.

Figure 3:
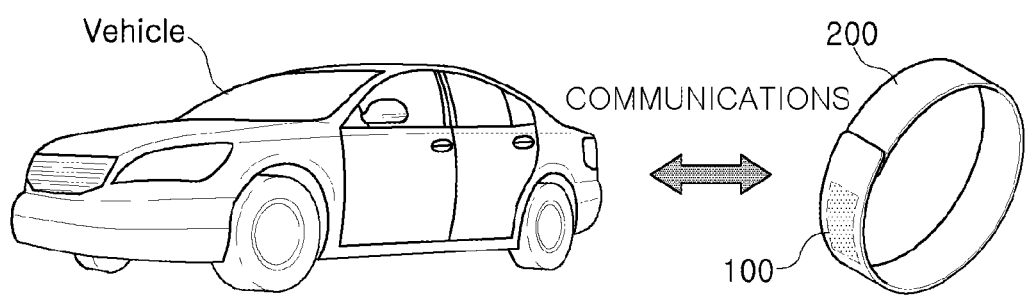
FIG. 3 is a view illustrating a communications operation of the electronic device of FIG. 1.

FIG. 3 is a view illustrating a communications operation of the electronic device of FIG. 1. Referring to FIG. 3, the communications module 100 embedded in the strap 200 may be operated as a smart key that performs wireless communications with a vehicle. The communications module 100 communicates with the vehicle at long distance using high frequency signals, and communicates with the vehicle at short distance using low frequency signals.

In order to perform the communications with the vehicle at long distance, the communications module 100 recognizes vehicle state information and the vehicle recognizes a user position to prepare a specific operation. In order to perform the communications with the vehicle at the short distance, the communications module 100 may perform a control for vehicle startup, such as engine start or stop, climate control, seat position adjustment, stereo settings, door lock or door unlock, and the vehicle may also authenticate the user.

Figure 4:
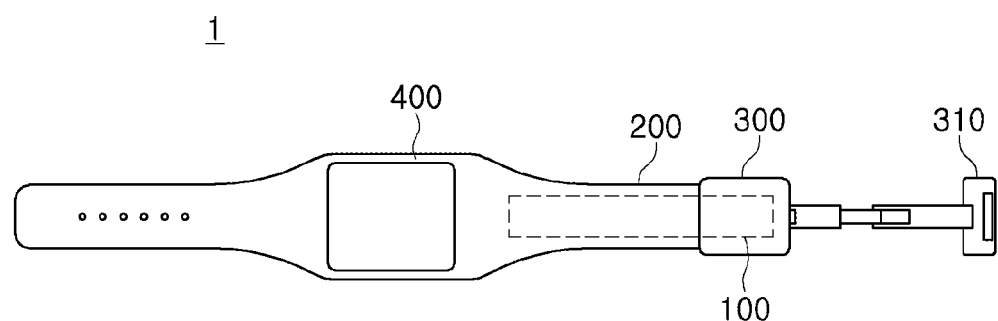
FIG. 4 is a view illustrating the electronic device according to an embodiment.

FIG. 4 is a view illustrating the electronic device according to an embodiment. Referring to FIG. 4, the electronic device 1 includes the communications module 100 and the strap 200, and further includes a coupling part 300, an attaching part 310, and a display part 400. For example, the electronic device 1 may be a smartwatch.

The communications module 100 may be embedded in the strap 200 and/or the coupling part 300. A detailed description of where the communications module 100 is disposed will be described below with reference to FIGS. 5A through 14B.

The coupling part 300 is fixed to the strap 200 to couple one end of the strap 200 to the other end. For example, the coupling part 300 may be a buckle formed of plastic or metal. In addition, the coupling part 300 may be thicker than the strap 200. Therefore, the communications module 100 may be entirely or partially embedded in the coupling part 300, and the communications module 100 may be further miniaturized.

The coupling part 300 can be attached and detached from the strap 200 with the attaching part 310. Therefore, the coupling part 300 can be removed from the electronic device 1 to thereby be remodeled, repaired, or upgraded.

The display part 400 displays information in order to provide the information to the user. For example, the display part 400 is a dial in the smartwatch.

In addition, both sides of the strap 200 is connected to each end of the display part 400. Due to characteristics of a display function of the display part 400, a region of the strap 200 close to the display part 400 has a width wider than that of a region of the strap 200 distal to the display part 400. Therefore, a component having a large size among components of the communications module 100 can be disposed in the region of the strap 200 close to the display part 400.

The display part 400 and the communications module 100 are designed to be separated from each other, whereby both of the display part 400 and the communications module 100 have a simple structure. Therefore, each of the display part 400 and the communications module 100 may be miniaturized and/or be flexible, and durability thereof may be improved.

Examples of detailed sizes will be described. A width of the coupling part 300 may be about 26.5 mm, a width of the display part 400 may be about 37.34 mm, and the coupling part 300 and the display part 400 may be spaced apart from each other by about 76 mm. A thickness of the coupling part 300 may be about 3.24 mm, and a thickness of the strap 200 may be about 1.8 mm to 2 mm.

The electronic device 1 including the communications module embedded in the strap according to an embodiment includes a plurality of electronic modules performing different electronic functions. For example, the electronic device 1 includes the communications module 100 performing a smart key function and the display part 400 performing a smartwatch function. Therefore, since a electronic device 1 has a smartwatch and smart key functionality, the user may conveniently use a single electronic device 1 for both functions. In addition, the communications module 100 is embedded in the strap 200, allowing for the upgrading of the communications module 100, strap 200, or both without replacing the smartwatch 400.

Figure 5A:
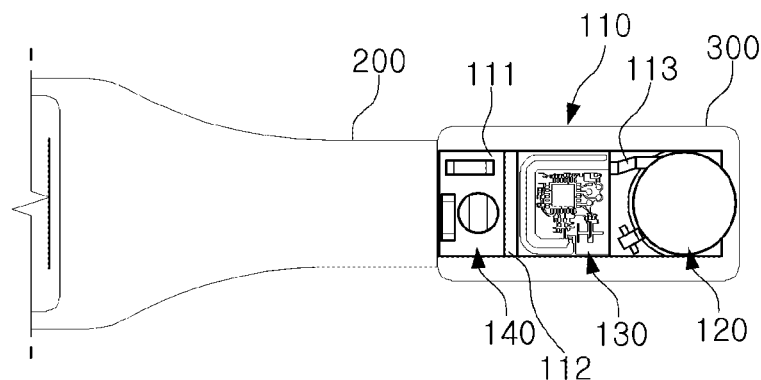
FIGS. 5A through 5C are views illustrating the electronic device of FIG. 4.
Figure 5B:
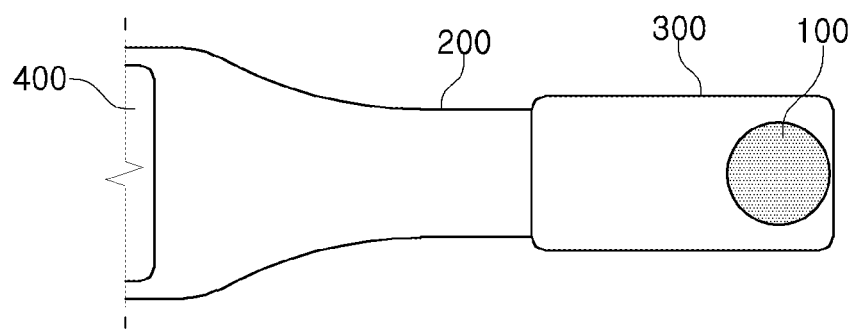
Figure 5C:
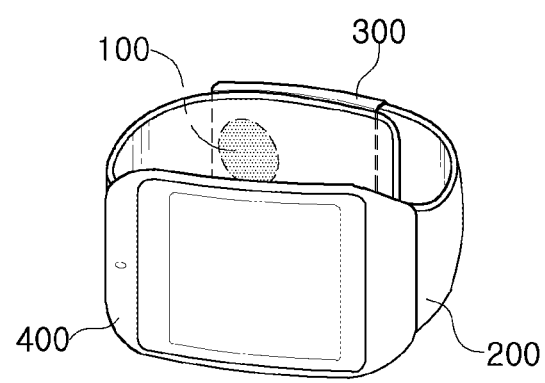

FIGS. 5A through 5C are views illustrating the electronic device of FIG. 4 in detail. FIG. 5A illustrates an inner portion of the electronic device, FIG. 5B illustrates an outer portion of the electronic device, and FIG. 5C illustrates the electronic device wherein one end and the other end of the strap 200 are coupled to each other by the coupling part 300.

Referring to FIGS. 5A through 5C, the substrate 110 on which the communications circuit 130 and the antenna 140 are mounted is embedded in the coupling part 300. A connection member 113 is connected to a side surface of the substrate 110 and to a side surface of the battery 120. Here, the connection member 113 functions as an electrode and a support member for the battery 120. In addition, the connection member 113 may be bent. That is, the battery 120 is not mounted on the substrate 110, but is disposed on surface of the substrate 110, and is spaced apart from the display part 400 at a distal end of the strap 200. Therefore, a total thickness of the communications module 100 may be reduced.

The coupling part 300 can be separated from the strap 200 by the attaching part 310. That is, the communications module 100 and the display part 400 can separated from each other. Therefore, in the electronic device according to an embodiment, the plurality of electronic modules performing different electronic functions may be separated from each other, and user convenience may be increased.

For example, the user may separate the communications module 100 from the electronic device and then repair the communications module 100 or lend the communications module 100 to another user in order for the other user to operate a vehicle without the smartwatch. In this case, the user may continuously use another electronic module (the display part 400) included in the electronic device. Additionally, when the communications module 100 is removed from the strap 200, the communications module 100 communicates with the user's vehicle to operate in a default state such as setting a maximum speed, stereo volume, engine performance, and seat position. The user may program the communications module 100 or the vehicle, or both, accordingly.

Figure 6A:
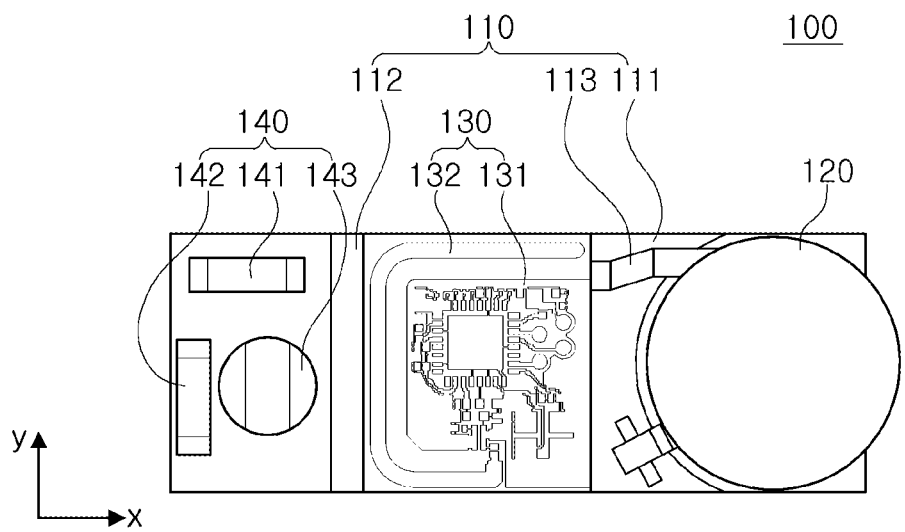
FIGS. 6A and 6B are enlarged views of a communications module illustrated in FIGS. 5A through 5C.
Figure 6B:
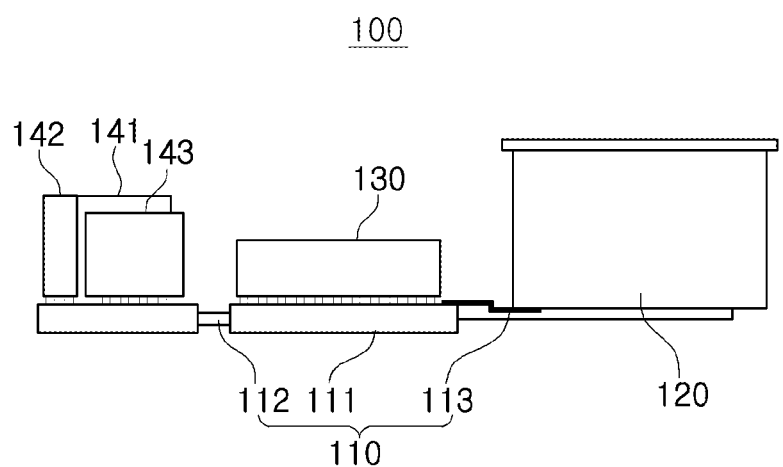

FIGS. 6A and 6B are enlarged views of a communications module illustrated in FIGS. 5A through 5C. FIG. 6A is a bottom view of the communications module, and FIG. 6B is a side view of the communications module.

Referring to FIGS. 6A and 6B, the substrate 110 includes the first regions 111, the second region 112, and the connection member 113, the communications circuit 130 includes a circuit part 131 and a high frequency antenna 132. The antenna 140 includes a first coil antenna 141, a second coil antenna 142, and a third coil antenna 143. In addition, the side surface of the battery 120 is connected through the connection member 113, and the second region 112 and the connection member 113 are disposed on a side surface of the first region 111.

As examples only, a width of the substrate 110 may be 16 mm. In addition, a total length of the battery 120 and the connection member 113 may be about 22 mm, a length of the first region 111 in which the communications circuit 130 is mounted may be about 14 mm, a length of the first region 111 in which the antenna 140 is mounted may be about 10 mm, and a length of the second region 112 may be about 2 mm. Therefore, a total length of the communications module may be about 48 mm. In addition, a total thickness of the communications module may be about 2.2 mm. The battery 120 is disposed on the side surface of the substrate 110 and be embedded in the coupling part, whereby the communications module may be further miniaturized.

Figure 7A:
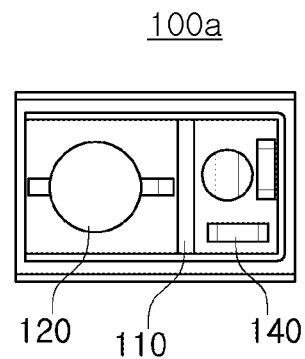
FIGS. 7A through 7C are views illustrating an electronic device according to an embodiment.
Figure 7B:
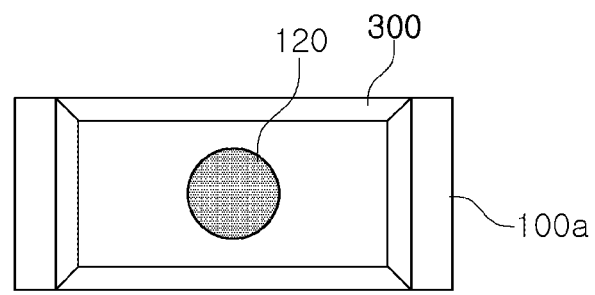
Figure 7C:
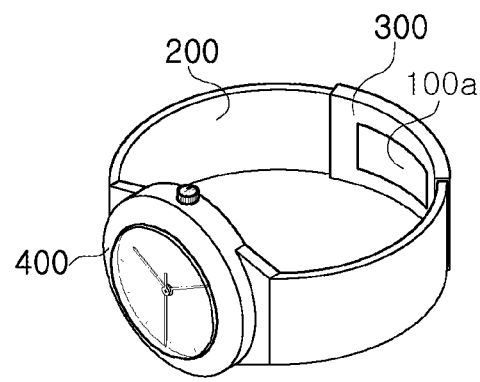

FIGS. 7A through 7C are views illustrating the electronic device according to an embodiment. FIG. 7A illustrates the communications module 100a, FIG. 7B illustrates an outer portion of the electronic device 100a, and FIG. 7C illustrates two ends of the strap 200 are coupled to each other by the coupling part 300.

Referring to FIGS. 7A through 7C, the substrate 110 having the battery 120 and the antenna 140 mounted on one surface thereof is embedded in the coupling part 300. Here, the communications circuit is mounted on the other surface of the substrate 110. That is, the battery 120, the communications circuit, and the antenna 140 are mounted on both surfaces of the substrate 110. The communications module 100a illustrated in FIGS. 7A through 7C may have a greater thickness and a shorter length than those in a case in which the above-mentioned components are only mounted on one surface of the substrate 110.

In addition, the coupling part 300 in which the communications module 100a is embedded is spaced apart from the display part 400, disposed on a distal end of the strap 200, and may be relatively thicker than the strap 200. That is, a thick communications module 100 is embedded in an already thick coupling part 300. Therefore, the strap 200 remains relatively thin as compared to the coupling part 300.

Figure 8:
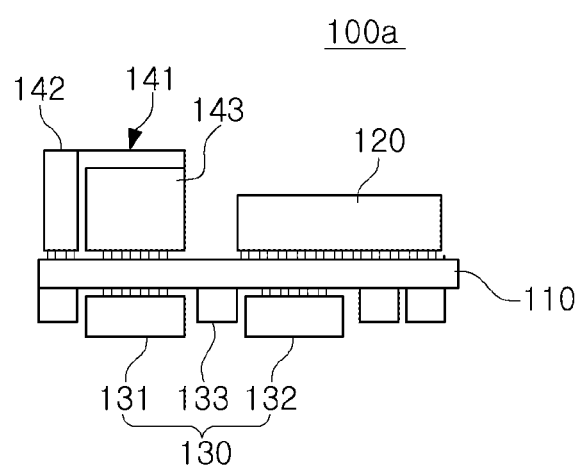
FIG. 8 is an enlarged view of the communications module illustrated in FIGS. 7A through 7C.

FIG. 8 is an enlarged view of a communications module 100a illustrated in FIGS. 7A through 7C. Referring to FIG. 8, the battery 120, the first coil antenna 141, the second coil antenna 142, and the third coil antenna are mounted on one surface of the substrate 110, and the circuit part 131, the high frequency antenna 132, and a passive element 133 are mounted on another surface of the substrate 110.

Figure 9A:
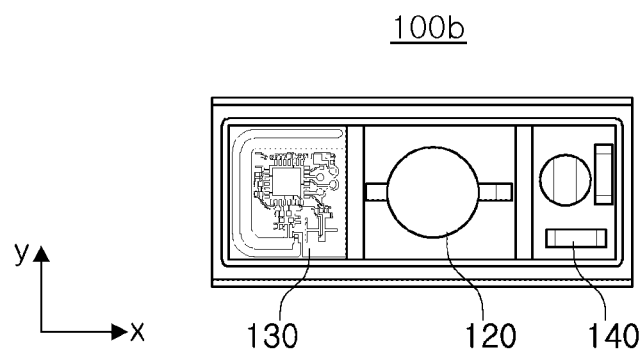
FIGS. 9A through 9C are views illustrating an electronic device according to an embodiment.
Figure 9B:
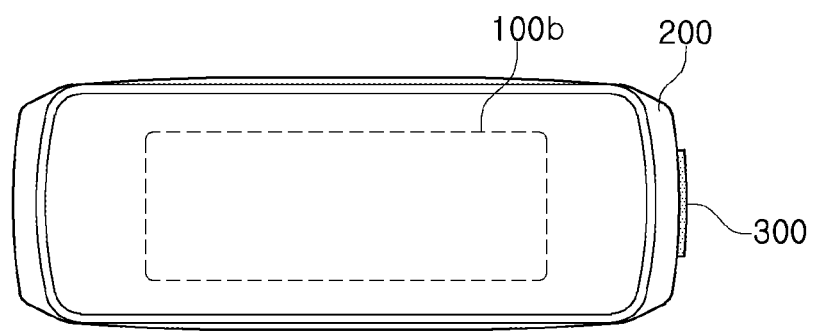
Figure 9C:
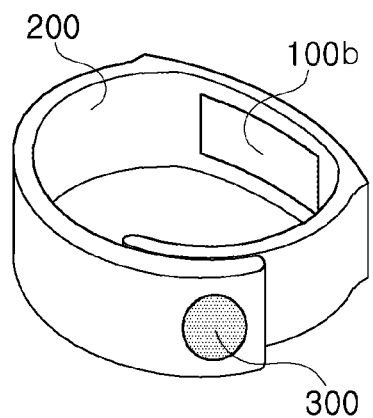

FIGS. 9A through 9C are views illustrating the electronic device according to an embodiment. FIG. 9A illustrates the communications module 100b, FIG. 9B illustrates an outer portion of the electronic device, and FIG. 9C illustrates the ends of the strap 200 coupled to each other by the coupling part 300.

Referring to FIGS. 9A through 9C, the communications circuit 130, the battery 120, and the antenna 140 are sequentially disposed in the communications module 100b. However, a sequence in which the communications circuit 130, the battery 120, and the antenna 140 are disposed is not particularly limited, and may be varied. In addition, the electronic device is not limited to a smartwatch. That is, the electronic device is not particularly limited as long as it is a wearable electronic device.

Figure 10:
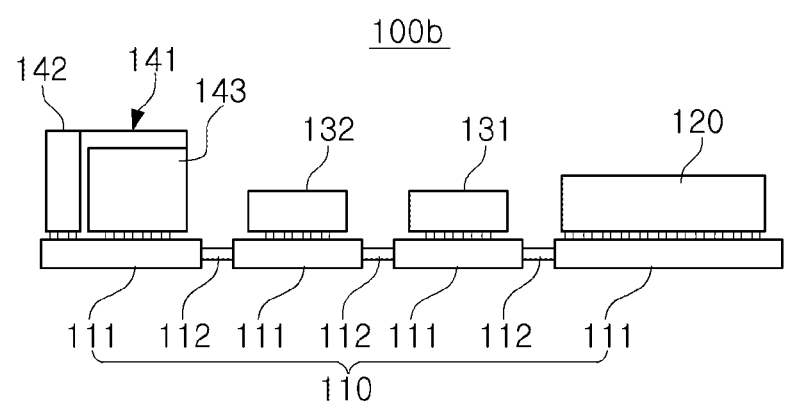
FIG. 10 is an enlarged view of the communications module illustrated in FIGS. 9A through 9C.

FIG. 10 is an enlarged view of the communications module 100b illustrated in FIGS. 9A through 9C. Referring to FIG. 10, the battery 120, the circuit part 131, the high frequency antenna 132, the first coil antenna 141, the second coil antenna 142, and the third coil antenna 143 are mounted on the first regions 111 of the substrate 110. The first and second regions 111 and 112 of the substrate 110 are connected to each other along lateral their surfaces. In addition, the circuit part 131 and the high frequency antenna 132 are separated from each other with the second region 112 interposed therebetween.

Figure 11A:
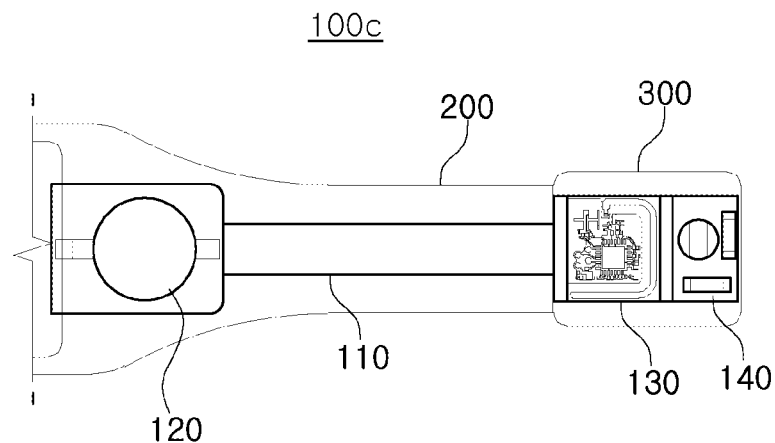
FIGS. 11A through 11C are views illustrating an electronic device according to an embodiment.
Figure 11B:
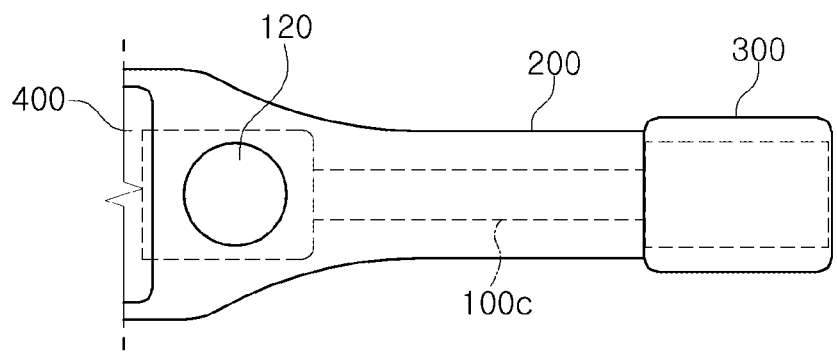
Figure 11C:
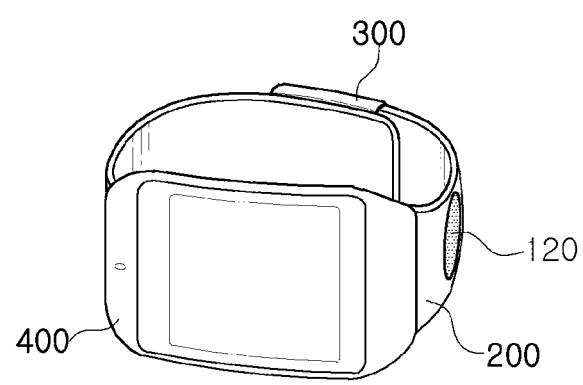

FIGS. 11A through 11C are views illustrating the electronic device according to an embodiment. FIG. 11A illustrates an inner portion of the electronic device showing a detail of a communications module 100c, FIG. 11B illustrates an outer portion of the electronic device, and FIG. 11C illustrates a form in which the ends of the strap 200 are coupled to each other by the coupling part 300.

Referring to FIGS. 11A to 110, the substrate 110 is embedding in the strap 200 and extends within the strap to the coupling part 300. That is, the battery 120 is disposed in a region of the strap 200 adjacent to the display part 400, and the communications circuit 130 and the antenna 140 are embedded in the coupling part 300. Here, the substrate 110 may be a flexible substrate that electrically connects the battery 120 and the communications circuit 130 to each other and may be resiliently bent.

The battery 120 may be relatively larger than the communications circuit 130 and the antenna 140, and may be exposed to the outside of the strap 200. That is, a portion of the communications module 100 may be externally exposed from the strap 200.

A thickness of the coupling part 300 in which the communications circuit 130 and the antenna 140 are embedded is thicker than that of the strap 200. In addition, the coupling part 300 is harder, or more rigid, than the strap 200. Therefore, the coupling part 300 may protect the communications circuit 130 and the antenna 140 housed therein. Therefore, durability of the communications module 100c may be improved, and the communications module 100c may be miniaturized.

A region between the battery 120 and the communications circuit 130 in the substrate may be resiliently bent. Therefore, the communications module 100c may also be flexible.

Figure 12A:
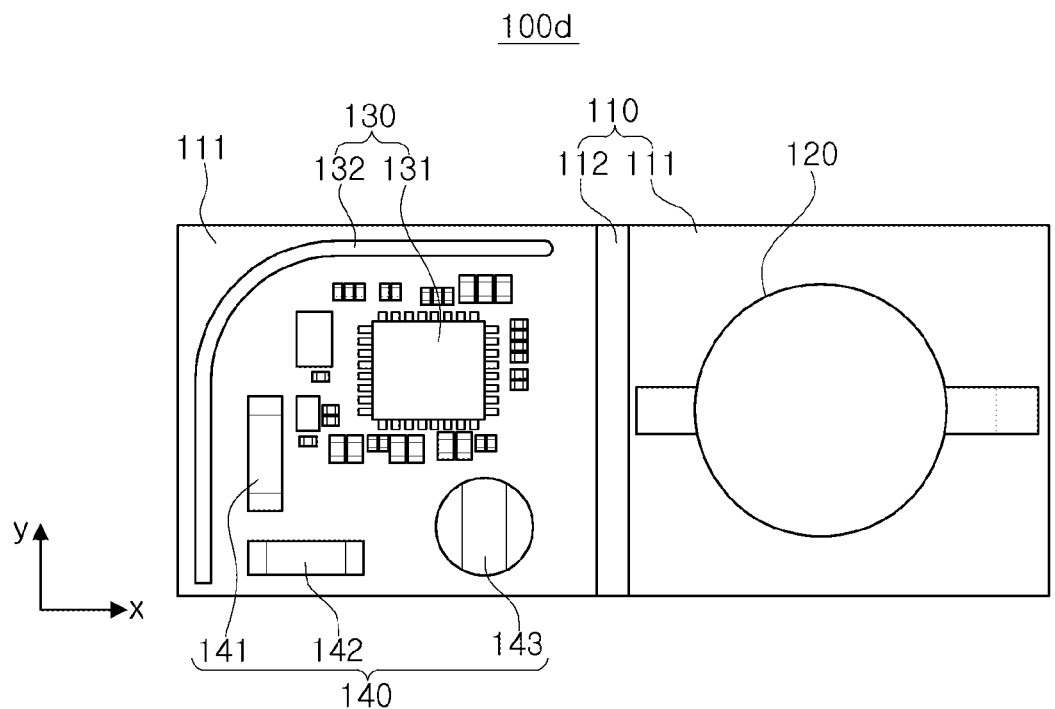
FIGS. 12A and 12B are enlarged views of a communications according to an embodiment.
Figure 12B:
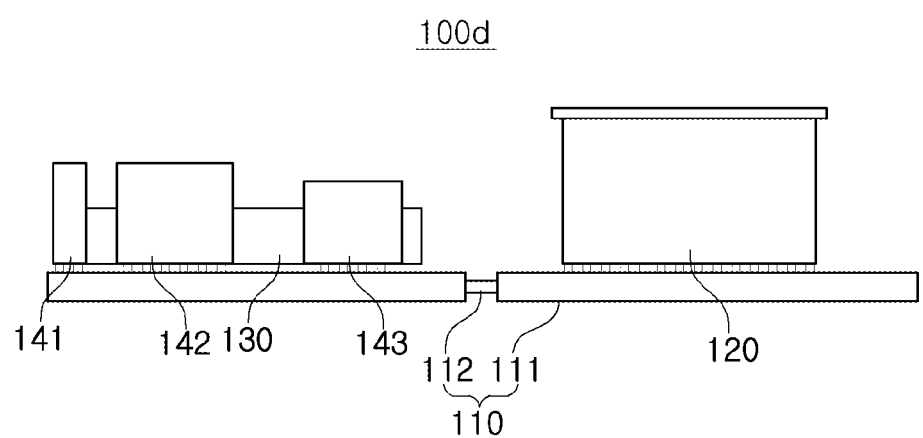

FIGS. 12A and 12B are enlarged views of a communications module 100d according to another embodiment. FIG. 12A is a plan view of the communications module 100d, and FIG. 12B is a side view of the communications module 100d.

Referring to FIGS. 12A and 12B, the substrate 110 includes the first regions 111 and the second region 112, the communications circuit 130 includes the circuit part 131 and the high frequency antenna 132, and the antenna 140 includes the first coil antenna 141, the second coil antenna 142, and the third coil antenna 143. In addition, the battery 120, communications circuit 130, and antenna 140 are mounted in the first regions 111. The second region 112 is disposed on the lateral side surface of the first regions 111.

For example only, a width of the substrate 110 may be 16 mm. In addition, a length of the first region 111 in which the battery 120 is mounted may be about 26 mm, and a length of the first region 111 in which the communications circuit 130 and the antenna 140 are mounted may be about 24 mm. That is, the communications circuit 130 and the antenna 140 may be mounted together in one first region 111. Relatively less flexibility of the communications circuit 130 and the antenna 140 may be desired in a case in which the communications circuit 130 and the antenna 140 are embedded in the coupling part 300 than in a case in which the communications circuit 130 and the antenna 140 are embedded in the strap 200. Therefore, the communications circuit 130 and the antenna 140 embedded in the coupling part 300 are disposed in one first region 111.

Figure 13A:
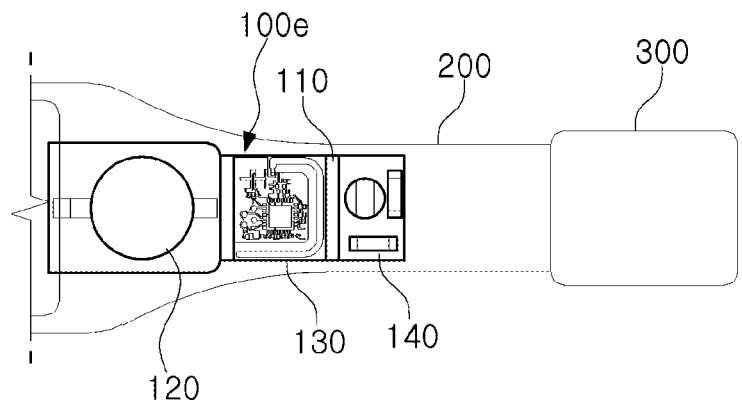
FIGS. 13A through 13C are views illustrating the electronic device according to an embodiment.
Figure 13B:
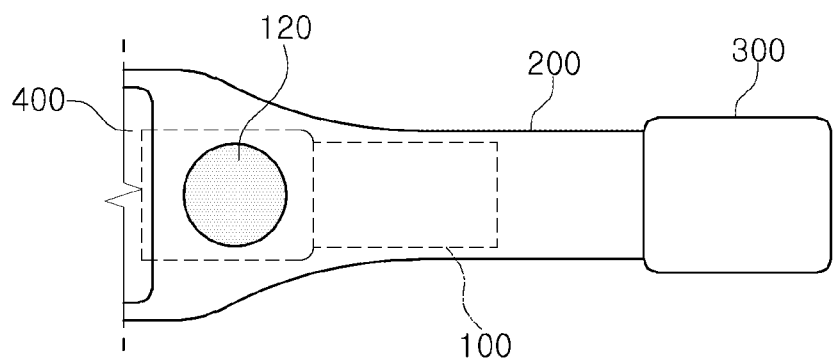
Figure 13C:
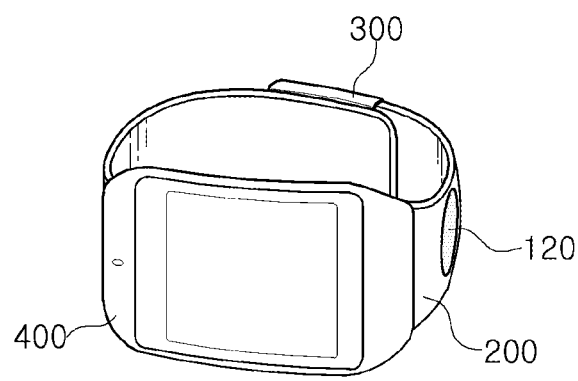

FIGS. 13A through 13C are views illustrating the electronic device according to an embodiment in the present disclosure in detail.

FIG. 13A illustrates an inner portion of the electronic device, FIG. 13B illustrates an outer portion of the electronic device, and FIG. 13C illustrates a form in which the ends of the strap 200 are coupled to each other by the coupling part 300. Referring to FIGS. 13A through 13C, the battery 120, the communications circuit 130, and the antenna 140 mounted on the substrate 110 are embedded in the strap 200, and are disposed adjacent to the display part 400, away from the coupling part 300.

The battery 120 may be relatively larger than the communications circuit 130 and the antenna 140. Therefore, the battery 120 is disposed closer to the display part 400 as compared to the communications circuit 130 and the antenna 140. Additionally, the battery 120 is externally exposed from the strap 200. That is, a portion of the communications module 100 externally exposed from the strap 200.

Figure 14A:
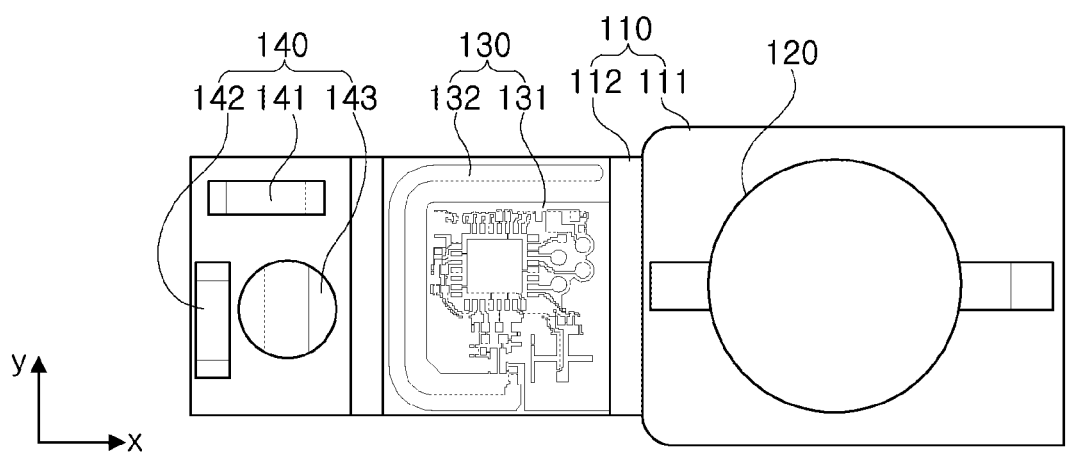
FIGS. 14A and 14B are enlarged views of the communications module illustrated in FIGS. 13A through 13C.
Figure 14B:
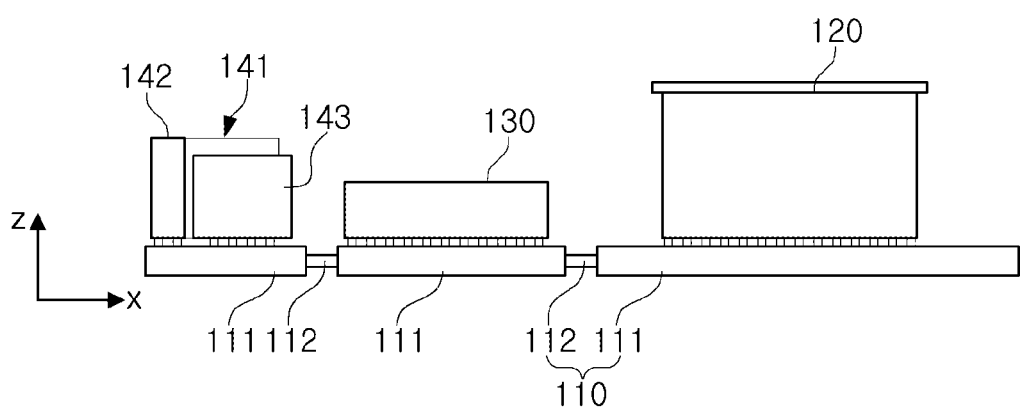

FIGS. 14A and 14B are enlarged views of a communications module illustrated in FIGS. 13A through 13C. FIG. 14A is a plan view of the communications module, and FIG. 14B is a side view of the communications module 100e. Referring to FIGS. 14A and 14B, the substrate 110 includes the first regions 111 and the second regions 112, the communications circuit 130 includes the circuit part 131 and the high frequency antenna 132, and the antenna 140 includes the first coil antenna 141, the second coil antenna 142, and the third coil antenna 143. In addition, the battery 120, the communications circuit, and the antenna are mounted on the first regions 111, and the second regions 112 interposed between the first regions 111 along their lateral side surfaces.

For example only, a width of the first region 111 in which the battery 120 is mounted may be about 20 mm, and widths of the other first regions 111 and the second region 112 may be 16 mm. In addition, a length of the first region 111 in which the battery 120 is mounted may be about 26 mm, a length of the first region 111 in which the communications circuit 130 is mounted may be about 14 mm, a length of the first region 111 in which the antenna 140 is mounted may be about 10 mm, and a length of the second region 112 may be about 2 mm. Therefore, a total length of the communications module may be about 54 mm. In addition, a thickness of the battery 120 may be about 2 mm, and a thickness of the substrate 110 may be about 0.6 mm.

For example, the first region 111 may be a printed circuit board (PCB) including four layers, and the second region 112 may be a rigid PCB including two layers. Therefore, the second region 112 may be resiliently bent.

For example, the high frequency antenna 132 is disposed to enclose the circuit part 131. Therefore, an empty space in the communications circuit 130 may be significantly reduced. For example, the first coil antenna 141 transmits and receives signals in an x axis direction (length direction), the second coil antenna 142 transmits and receives signals in a y axis direction (width direction), and the third coil antenna 143 transmits and receives signals in a z axis direction (thickness direction). Therefore, the antenna 140 three-dimensionally transmits and receives uniformly signals.

Figure 15A:
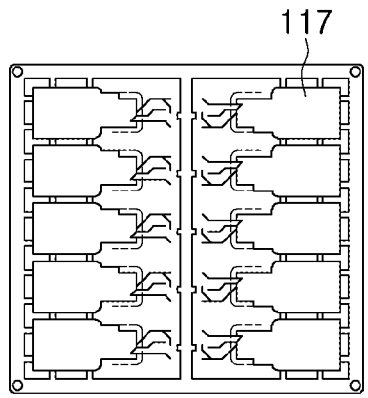
FIGS. 15A through 15F are views for depicting a process for manufacturing a substrate included in the electronic device of FIGS. 13A through 13C.
Figure 15B:
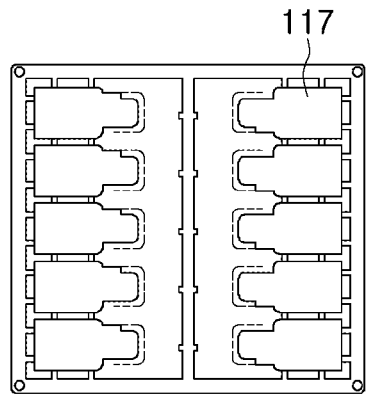
Figure 15C:
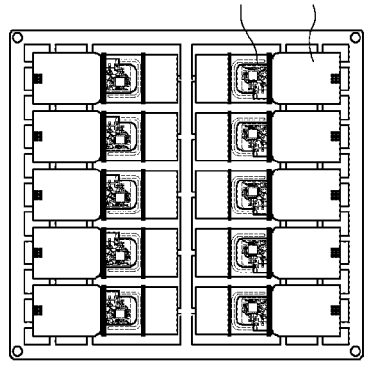
Figure 15D:
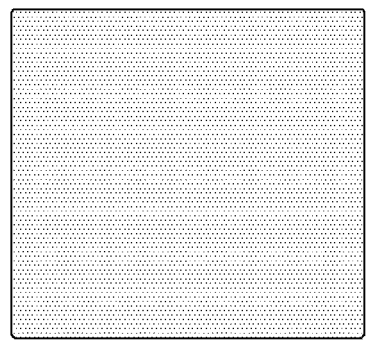
Figure 15E:
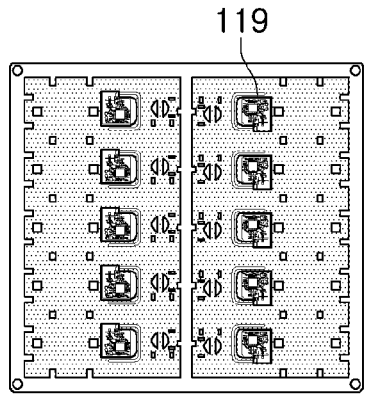
Figure 15F:
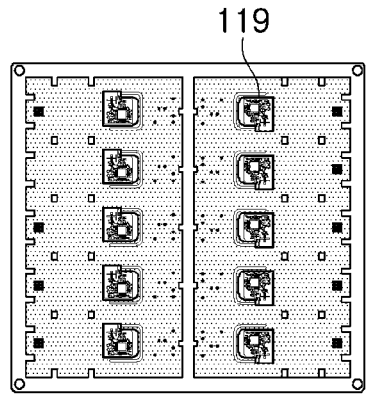

FIGS. 15A through 15F are views for describing a process of manufacturing a substrate included in the electronic device of FIGS. 13A through 13C. FIG. 15A illustrates a second layer of the substrate, FIG. 15B illustrates a third layer of the substrate, FIG. 15C illustrates second and third layers of the substrates combined with each other, FIG. 15D illustrates copper foil layers to be stacked on the combined second and third layers of the substrates, FIG. 15E illustrates a fourth layer of the substrate, and FIG. 15F illustrates a first layer of the substrate.

Referring to FIGS. 15A through 15F, the substrate may be a flexible PCB in which the first layer BOTTOM, the second layer LAYER2, the third layer LAYER3, and the fourth layer TOP are stacked.

First, the second layer LAYER2 and the third layer LAYER3, which are inner layers, are stacked as double-sided (F-PCB) materials, and have an adhesive PP applied thereto. Then, a region 117 in which a circuit is implemented in the inner layers is cut to be divided into a first region 118 and a second region 119.

Then, the copper foil layers are disposed above and below the inner layers. The fourth layer TOP is disposed above the upper copper foil layer, and first layer BOTTOM is disposed below the bottom copper layer. A pressing process is performed on the plurality of stacked layers.

As set forth above, the electronic device according to an embodiment may have improved durability in spite of being worn on the body. In addition, the communications module that is flexible and/or is miniaturized is embedded in the electronic device according to one or more embodiments in the present disclosure.

As a non-exhaustive example only, an electronic device as described herein may be a mobile device, such as a wearable smart device (such as a ring, a watch, a pair of glasses, a bracelet, an ankle bracelet, a belt, a necklace, an earring, a headband, a helmet, or a device embedded in clothing), or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
    a strap;
    a coupling part disposed on one end of the strap configured to couple the one end of the strap to another end of the strap;
    a communications module embedded in the coupling part and configured to perform wireless communications; and
    a display part disposed on the strap, connected to the communications module, and configured to display information.

2. The electronic device of claim 1, further comprising:
    an attaching part configured to attach and detach the coupling part to and from the strap.

3. The electronic device of claim 1, wherein the display part is disposed on at an intermediate portion of the strap.

4. The electronic device of claim 1, further comprising:
    a battery embedded in the strap and configured to supply power to the communications module; and
    a flexible substrate embedded in the strap, configured to connect the battery to the communications module, and resiliently bend.

5. The electronic device of claim 4, wherein a portion of the battery is externally exposed.

6. The electronic device of claim 1, wherein the communications module comprises:
    a communications circuit mounted on a substrate and configured to process communications signals;
    an antenna disposed on the substrate and configured to transmit and receive the communications signals; and
    a battery disposed on the substrate and configured to supply power to the communications circuit.

7. The electronic device of claim 6, wherein one of the communications circuit, the antenna, and the battery is mounted on one surface of the substrate, and two of the communications circuit, the antenna, and the battery not mounted on the one surface are mounted on another surface of the substrate.

8. The electronic device of claim 6, wherein the communications circuit is configured to process first communications signals and second communications signals, wherein the second communications signals are in a frequency band higher than a frequency band of the first communications signals, and
    further comprises a high frequency antenna configured to transmit and receive the second communications signals.

9. The electronic device of claim 8, wherein the high frequency antenna surrounds a portion of the communications circuit.

10. The electronic device of claim 8, wherein the antenna comprises three coil antennas configured to transmit and receive the first communications signals in different directions.

11. The electronic device of claim 10, wherein the communications module is configured to transmit and receive the first communications signals to control a vehicle.

12. The electronic device of claim 1, further comprising:
a second communications module embedded in the strap and configured to perform wireless communications,
wherein the second communications module comprises:
a second substrate comprising a resiliently flexible region;
a second communications circuit mounted on a substrate region external to the resiliently flexible region and configured to process communications signals;
a second antenna mounted on the substrate region external to the resiliently flexible region and configured to transmit and receive the communications signals; and
a second battery mounted on the substrate region external to the resiliently flexible region and configured to supply power to the second communications circuit.

13. The electronic device of claim 1, wherein a region of the strap proximate to the display part has a width wider than a region of the strap distal to the display part.

14. An electronic device, comprising:
a strap;
a coupling part disposed on one end of the strap configured to couple one end of the strap to another end of the strap; and
a communications module embedded in the strap and configured to perform wireless communications,
wherein the communications module comprises:
a substrate comprising a resiliently flexible region;
a communications circuit mounted on a substrate region external to the resiliently flexible region and configured to process communications signals;
an antenna mounted on the substrate region external to the resiliently flexible region and configured to transmit and receive the communications signals; and
a battery mounted on the substrate region external to the resiliently flexible region and configured to supply power to the communications circuit.

15. The electronic device of claim 14, further comprising:
a display part disposed on the strap, connected to the communications module, and configured to display information received from the antenna.

16. The electronic device of claim 14, wherein the communications circuit is configured to process first communications signals and second communications signals, wherein the second communications signals are in a frequency band higher than that of the first communications signals, and
the communications unit further comprises a high frequency antenna configured to transmit and receive the second communications signals.

17. The electronic device of claim 16, wherein the high frequency antenna surrounds a portion of the communications circuit.

18. The electronic device of claim 14, wherein the communications module is configured to transmit and receive first communications signals for vehicle control, and
the antenna comprises three coil antennas configured to transmit and receive the first communications signals in different directions.

19. The electronic device of claim 14, wherein the battery is disposed on the substrate at one side of the resiliently flexible region, and
the communications circuit and the antenna are disposed on the substrate at another side of the resiliently flexible region.

20. The electronic device of claim 14, wherein the substrate comprises first and second resiliently flexible regions,
the communications circuit is disposed between the first and second resiliently flexible regions, and
the antenna and the battery are disposed on opposite ends of the substrate.

* * * * *